United States Patent Office 2,802,842
Patented Aug. 13, 1957

2,802,842

PLASTICIZATION OF SYNTHETIC DRYING OIL FILMS

Joseph F. Nelson, Rahway, and Donald F. Koenecke, Elizabeth, N. J., assignors to Esso Research and Engineering Company, a corporation of Delaware No Drawing. Application December 29, 1951, Serial No. 264,222

7 Claims. (Cl. 260—407)

This invention relates to an improvement in synthetic drying oils and more particularly relates to an improvement in the flexibility and gloss of the air-dried films from these drying oils.

Synthetic drying oils can be prepared by various methods from butadiene alone or from mixtures containing butadiene together with materials copolymerizable therewith. Sodium polymerization, emulsion polymerization as well as bulk polymerization in the presence of a diluent and a peroxide type catalyst have been used for this purpose with varying degrees of success. However, among the difficulties encountered with various synthetic drying oils were poor drying rate, poor flexibility, poor adhesion of air-dried coatings, poor wetting properties and consequent difficulty of grinding in pigments, poor gloss and streakiness of brushed enamel films. While some of these disadvantages have been overcome in the past, this usually resulted in aggravation of other undesirable characteristics. In general, the sodium catalyzed polymers have been found to be most economical to produce. They dry in thin films in the presence of metallic soap driers to form protective coatings with exceptional gloss, hardness and mar resistance and good chemical resistance. However, experience has established that the air-dried films produced from these oils undergo progressive embrittlement upon aging. Although there are a number of applications where flexibilty is not a critical requirement, e. g., coatings for interior use such as interior concrete floor paints, interior architectural enamels, interior wall paints, machinery enamels, etc., it does become important when the enamel is used to coat surfaces which may be subjected to stress, such as impact or temperature change. For example, wood expands and contracts with variations in relative humidity and therefore requires a flexible film.

It is recognized that the embrittlement of air-dried films is due to continued oxidation of the highly unsaturated (initial iodine value of about 325) film. The first logical method of preventing embrittlement is to attempt to inhibit the oxidation. Conventional agents such as phenyl beta naphthylamine, 2,4-dimethyl-6-tertiary butyl phenol, guaiacol and other antioxidants have been found to be of no value. They merely delay the initial drying rate. Upon aging 1–2 weeks, such films have been found to fail flexibility test.

Cross linking agents such as paraquinone dioxime, sulfur, and peroxides have also been found to be ineffective when used at room temperature with or without lead, cobalt and manganese soap driers (naphthenates).

Attempts to use liquid plasticizers such as dioctyl phthalate, tricresyl phosphate, 1-3 butylene glycol esters, dilinoleic acid, esters and partial esters of pentaerythritol and stearic, linoleic and 2 ethyl hexanoic acids have all failed because of dry film incompatibility, or retarded drying rate. In addition, these compounds impart low plasticizing action to films in which they are used.

Polymeric resins such as S-polymer (copolymer of styrene and isobutylene), various butyl rubbers, polyisobutylene are also unsuitable because of poor compatibility. S-polymer of below 0.7 intrinsic viscosity appeared to be compatible but failed to plasticize.

High solvent strength hydrocarbon resins are compatible but are not plasticizers. They are suitable only for holding other materials such as esters and S-polymer in solution in the films, but these combinations are not effective plasticizers.

It has now been discovered that the lack of flexibility of the air-dried films prepared from the sodium polymerized synthetic drying oils can be overcome by cobodying the drying oils with a suitable non-conjugated natural drying oil. If desired, the synthetic drying oils may also be combined with a small amount of maleic anhydride to improve their pigment wetting properties.

For the purposes of this invention it is particularly desirable to use drying oils which have been obtained by copolymerizing 60 to 90 parts of butadiene-1,3 with 40 to 10 parts of styrene, preferably about 75 to 85 parts of the former and 25 to 15 parts of the latter, the polymerization being carried out at 20 to 100° C., preferably below the melting point of the catalyst or between 50 and 85° C., in a reaction diluent. Temperatures near the lower end of the range set forth are generally more suitable for batch polymerization and temperatures nearer the upper end of the range are particularly suited for continuous operation. As a polymerization catalyst about 1 to 6 parts, preferably about 1.2 to 3 parts, of a finely dispersed metallic sodium catalyst is used in the optional presence of various polymerization modifiers which tend to promote the reaction and produce colorless products of more exactly reproducible drying rates. As reaction diluent it is desirable to use, for example, a naphtha having a boiling range between about 90 and 120° C. or straight run mineral spirits such as Varsol (boiling range 150 to 200° C.). Inert hydrocarbon diluents such as xylene, benzene, toluene, cyclohexane or the like, individually or in admixture with each other, may also be used. To be suitable for the polymerization reaction here involved, the diluents should have a boiling range within the limits of about 10° C. and 200° C. The diluents are usually used in amounts ranging from 50 to 500, preferably 200 to 300 parts per 100 parts of monomers.

Instead of using inert diluents, it is also possible to use modifying diluents such as butene-2 or other low boiling olefins which modify the reaction by limited copolymerization and chain termination. Various ethers having more than two carbon atoms per molecule such as diethyl ether, diisopropyl ether, dioxane, vinyl ethyl ether, vinyl isopropyl ether, vinyl isobutyl ether, anisole, phenetole and other ethers of various types are also useful as diluents and are particularly helpful as co-diluents to insure formation of colorless products when used in amounts ranging from about 10 to 35 parts per 100 parts of monomer together with aforesaid amount of inert diluent such as solvent naphtha. p-dioxane, m-dioxane and their various methyl and ethyl homologues are particularly preferred. In selecting the ether codiluent, it is especially desirable to select an ether having a boiling point at least 10° C. below the lower limit of the boiling range of the hydrocarbon diluent and thus, when using Varsol, ether co-diluents boiling between about 25 and 140° C. are preferred in order to permit their ready recovery from the polymerized reaction mixture.

Other means of modifying the properties of the polymer product involve the substitution of all or at least part of the butadiene feed with other diolefins such as isoprene, 2,3-dimethyl butadiene-1,3, piperylene or 2-methyl pentadiene-1,3. Likewise, styrene may be replaced by its various ring-alkylated homologues such as the various methyl styrenes, dimethyl styrenes, ethyl styrenes, or diethyl styrenes. In the synthesis it is desirable to add the styrene monomer to the reaction mixture only after the polymerization of the butadiene has been initiated. By this expedient the induction period is quite substantially reduced, and a more homogeneous type of copolymer is obtained.

When a coarse dispersion of sodium is used as catalyst, it is also advantageous to use about 1 to 50%, preferably 10 to 20% based on sodium of a $C_1$ to $C_5$ aliphatic alcohol. Secondary and tertiary alcohols, particularly isopropanol or teritary butanol, are preferred. Such alcohols act as polymerization promoters and, depending on the degree of catalyst dispersion, have a more or less pronounced effect on the intrinsic viscosity of the resulting product. The reaction time and induction period also vary depending on the degree of catalyst dispersion and reaction temperature, the reaction time ranging from about 40 hours with a coarse catalyst at about 50° C. to about 15 minutes at about 100° C. with a catalyst particle size of less than 100 microns diameter. While sodium is preferred, similar catalysts such as potassium, sodium hydride and various alloys of sodium are also useful. Agitation of the reaction mixture during synthesis increases the efficiency of the catalyst. Conversions of 50 to 100% on monomers can be accomplished fairly readily in batch-type as well as in continuous polymerizations, although the catalyst requirements are usually twice or three times greater for continuous operation than for a batch operation of equal conversion, depending on conditions, especially temperature.

Destruction of catalyst at the end of the reaction is effectively accomplished by adding to the reactor a moderate excess of acetic acid, and agitating at the reaction temperature for another half hour or so. After destruction of the residual sodium, the excess of acetic acid may be neutralized with anhydrous ammonia. This is especially desirable if the diluent is to be removed and recycled. The neutralized product is then filtered with a filter aid such as silica gel, clay, charcoal or its equivalent to remove the sodium and ammonium acetates.

In the preferred modification the clear, colorless filtrate is then fractionally distilled to remove the ether promoter and a portion of the hydrocarbon diluent, or even all of the hydrocarbon in some cases. In any case, the hydrocarbon diluent which is stripped off is recycled to the polymerization step. Finally, if the polymerization is carried out in a relatively large amount of hydrocarbon diluent so that the resulting polymer solution is too dilute for use as a varnish or enamel base, it is desirable to distill off additional hydrocarbons until a product containing about 50% non-volatile matter is obtained, the non-volatile matter being the polymeric drying oil. The resulting product, being a solution of polymeric drying oil in a suitable hydrocarbon solvent such as solvent naphtha or mineral spirits, is a clear, colorless varnish composition having a viscosity between about 0.5 and 25 poises at 50% non-volatile matter, preferably between 1.0 and 10 poises. The molecular weight of the non-volatile or polymeric constituents of the product usually corresponds to an intrinsic viscosity of about 0.10 to 0.6 or preferably 0.15 to 0.40. If desired, the product viscosity can be readily increased within or above these limits by heat bodying at temperatures between 200 and 300° C., e. g. at 220 to 260° C. Such clear varnish compositions can be brushed, poured or sprayed and give good clear films on drying in air or baking, especially when conventional driers such as the naphthenates or octoates of cobalt, lead or manganese are added thereto.

However, while drying oil compositions of the type described above give a good varnish, the films tend to become brittle on aging. This is particularly disadvantageous for certain purposes, as pointed out above.

According to the present invention, therefore, this disadvantage is overcome by heating the synthetic drying oil with 10 to 50% by weight, preferably 10 to 25%, of a non-conjugated natural drying oil at a temperature between 400° and 600° F. for from 15 minutes to 2.5 hours, depending upon the temperature. The vegetable drying oil used should be low in conjugated dienes, i. e. it should have a diene number near zero but also should have considerable unsaturation. The iodine number should be between 130 and 180 as determined by the Wijs method. Suitable natural drying oils to be heated with the synthetic drying oil comprise linseed, soybean, rapeseed, cottonseed, perilla, corn, fish, sunflower seed, safflower, etc., oils.

The following examples will serve to illustrate the mode of operation as well as the advantages of the present invention, though it will be understood that various other embodiments or modifications not specifically illustrated herein are possible without departing from the spirit or scope of the invention. For instance, instead of co-reacting the natural drying oil with the synthetic drying oil in a non-catalytic thermal process, the heat bodying reaction may be further accelerated by operating in the presence of a suitable catalyst, e. g., fuller's earth or other active clays. All quantities described in this specification and the appended claims as "parts" or "percent" refer to "parts by weight" or "percent by weight" unless expressly stated otherwise.

EXAMPLE 1

A mixture of 100 grams of alkali refined linseed oil and 300 grams of a synthetic oily copolymer of 80% butadiene and 20% styrene having a 1.8 poise viscosity in 50% Varsol solution was heated for 75 minutes from room temperature to 450° F. in an open aluminum agitated kettle, held under a blanket of carbon dioxide and then allowed to cool. The following time schedule was observed:

| Time: | Temperature |
|---|---|
| 0 minutes | Room |
| 15 minutes | 325° F. |
| 25 minutes | 415° F. |
| 55 minutes | 415° F. |
| 75 minutes | 450° F. off the heat. |

The final product weighed 395 g. showing a loss of 1.25% and had a viscosity of 1.35 poises at 54.8% NVM in Varsol solution. The Gardner color was 5. At the point of removal from the heat the copolymer was approaching the gelled state as indicated by a short string from a hot thermometer dipped into the oil.

EXAMPLE 2

A mixture of 30 g. alkali refined linseed oil and 540 g. of a 1 poise, 50% solution in Varsol of an oily copolymer of 80% butadiene and 20% styrene containing 0.2% maleic anhydride based on the copolymer were heated slowly with agitation in an aluminum kettle under $CO_2$ while driving off the solvent. The following time schedule was observed until a heavy drop (indicating polymerization) from the thermometer became slightly stringy:

| Time: | Temperature |
|---|---|
| 0 minutes | Room. |
| 30 minutes | 374° F. |
| 60 minutes | 374° F. |
| 90 minutes | 465° F. |
| 120 minutes | 465° F. off the heat. |

300 g. of polymer remained with a viscosity of 2.4 poise and a Gardner color of 4 at 50% NVM in Varsol.

EXAMPLE 3

A mixture identical with that of Example 2 except that the linseed oil had been prebodied to 36 poises was heated in the same manner as in Example 2 with the following time schedule:

Time: | Temperature
---|---
0 minutes | Room.
30 minutes | 350° F.
60 minutes | 350° F.
90 minutes | 450° F.
105 minutes | 450° F. heat off.

263 g. of the copolymer remained, representing a 9% loss (partially gelled). A 50% solution of the product in Varsol had a viscosity of 0.9 poise and a Gardner color of 3. The prebodied linseed oil underwent selective gelation with part of the polymer. Thus the true effect was lost. From these results it was concluded that unbodied oil is preferable but prebodied vegetable oil can be used.

EXAMPLE 4

The following tables illustrate the effect of the cobodying treatment of this invention (when using various vegetable drying oils) on the aging characteristics of the films produced from the cobodied product:

Table 1

| Sample | Composition [1] | | Drying Time (Hours) [2] | | | |
|---|---|---|---|---|---|---|
| | Vegetable Oil | Percent | 2 | 4 | 6 | 24 |
| 1 (Example 1) | Linseed | 25.0 | 5 | 3 | 0 | 0 |
| 2 (Example 2) | Linseed | 10.0 | 7 | 4 | 2 | 0 |
| 3 (Example 3) | Linseed [3] | 10.0 | 7 | 7 | 6 | 0 |
| 4 | Linseed | 50.0 | 2 | 1 | 0 | 0 |
| 5 | Soya | 25.0 | 8 | 7 | 4 | 0 |
| 6 | Soya | 75.0 | 8 | 4 | 1 | 0 |
| 7 | Tung | 10.0 | 6 | 6 | 6 | 1 |
| 8 | Oiticica | 10.0 | 7 | 6 | 6 | 1 |
| 9 | Dehydrated Castor | 9.1 | 3 | 1 | 1 | 0 |
| 10 | Control | 0.0 | 7 | 5 | 1 | 0 |

[1] The composition is based on the polymer content, e. g. Sample 1 is 75% oily polymer and 25% linseed oil.
[2] The drying times were determined in the presence of 0.4% lead and 0.04% manganese driers as the naphthenate soap in terms of metal content based on the polymer. Drying time code: 9—wet, 7—barely clings to finger, 6—set to touch, 3—dust free, 0—tack free.
[3] The linseed oil was alkali refined and prebodied to 36 poise.

Table 3

| Sample | Composition [1] | | Evaluation, 1 Wk. Old [2] | | |
|---|---|---|---|---|---|
| | Vegetable Oil | Percent | Sward Hard. | Water Resist. | Grease Resist. |
| 1 (Example 1) | Linseed | 25.0 | 66 | 5 | 0 |
| 2 (Example 2) | Linseed | 10.0 | 60 | 5 | 0 |
| 3 (Example 3) | Linseed [3] | 10.0 | 62 | 4 | 0 |
| 4 | Linseed | 50.0 | 54 | 5 | 0 |
| 5 | Soya | 25.0 | 56 | 2 | 0 |
| 6 | Soya | 75.0 | 12 | 3 | 1 |
| 7 | Tung | 10.0 | 9 | 5 | [4] 0 |
| 8 | Oiticica | 10.0 | 8 | 5 | [4] 0 |
| 9 | Dehydrated Castor | 9.1 | | 2 | [4] 0 |
| 10 | Control | 0.0 | 68 | 3 | 0 |

ENAMELS

| 11 | Linseed [5] | 25.0 | 48 | 1 | 0 |
| 12 | Linseed [5] | 25.0 | 59 | 3 | 0 |
| 13 | Control | 0.0 | 54 | 0 | 0 |
| 14 | Alkyd Control | | 14 | 2 | 5 |

[1] The composition is based on the polymer content, e. g. Sample 1 is 75% oily polymer and 25% linseed oil.
[2] Evaluation code: Sward hardness in percent based on plate glass as 100. Water and grease resistance, 0—unaffected, 1-3 discolored or whitened and less adhesion, 4-6 softened and loss in adhesion, 7-9 pinholed or blistered to failure by removal of the film. Exposures: 5 hours to distilled water, 2 hours to a 1:1 mixture of oleic acid and Crisco.
[3] The linseed oil was alkali refined and prebodied to 36 poise.
[4] Very seedy.
[5] Enamels were made with vehicle of Sample 1. Sample 11 contained 70% by weight titanium dioxide pigment and 30% vehicle in the non-volatile. Sample 12 contained equal parts.

The above data clearly show that the film made from copolymer oil without the natural drying oil is brittle after only one week's aging, while the films made from the copolymer which had been cobodied with 10–50% non-conjugated vegetable drying oils were still flexible for at least twelve weeks. The data further show that the conjugated oils, tung and oiticica become brittle after only four weeks aging. Furthermore, these two oils as well as dehydrated castor oil form heterogeneous mixtures with the polymer oil as evidenced by a seedy appearance. It

Table 2

A

| Sample | Composition [1] | | Flexibility Upon Aging Air Dried Film [2] | | | | | | | | |
|---|---|---|---|---|---|---|---|---|---|---|---|
| | Vegetable Oil | Percent | Wks. | C | R | Wks. | C | R | Wks. | C | R |
| 1 (Example 1) | Linseed | 25.0 | 1 | 0 | ⅛ | 3 | 0 | ¼ | 5 | 0 | ½ |
| 2 (Example 2) | Linseed | 10.0 | 1 | 0 | ⅛ | 3 | 0 | ⅛ | | | |
| 3 (Example 3) | Linseed [3] | 10.0 | 1 | 0 | ⅛ | 3 | 0 | ⅛ | | | |
| 4 | Linseed | 50.0 | 1 | 0 | ⅛ | 3 | 0 | ¼ | 6 | 5 | ¾ |
| 5 | Soya | 25.0 | 1 | 0 | ⅛ | 3 | 0 | ⅛ | 6 | 0 | ⅛ |
| 6 | Soya | 75.0 | 1 | 0 | ⅛ | 3 | 0 | ⅛ | | | |
| 7 | Tung | 10.0 | 1 | 0 | ⅛ | 4 | 5 | ⅝ | | | |
| 8 | Oiticica | 10.0 | 1 | 0 | ⅛ | 4 | 5 | ¾ | | | |
| 9 | Dehydrated Castor | 9.1 | | | | 3 | 0 | ⅛ | | | |
| 10 | Control | 0.0 | 1 | 5 | ¼ | 3 | 5 | ¼ | 5 | 6 | ¾ |

B

| 1 (Example 1) | Linseed | 25.0 | 8 | 0 | ¾ | 10 | 0 | ⅜ | 12 | 0 | ½ |
| 2 (Example 2) | Linseed | 10.0 | 8 | 5 | ½ | 10 | 0 | ⅜ | 12 | 5 | ¾ |
| 3 (Example 3) | Linseed [3] | 10.0 | 8 | 1 | ½ | 10 | 1 | ¼ | 12 | 0 | ¾ |
| 4 | Linseed | 50.0 | 8 | 0 | ⅜ | 10 | 0 | ⅛ | 12 | 5 | ¾ |
| 9 | Dehydrated Castor | 9.1 | 7 | 6 | ½ | | | | | | |

ENAMELS

| 11 | Linseed [4] | 25.0 | 2 | 0 | ⅛ | 6 | 0 | ¼ | 8 | 0 | ⅜ |
| 12 | Linseed [4] | 25.0 | 2 | 0 | ⅛ | 6 | 0 | ⅛ | 8 | 0 | ¼ |
| 13 | Control | 0.0 | 2 | 0 | ⅛ | 6 | 5 | ⅜ | 8 | 5 | ½ |
| 14 | Alkyd Control | | 2 | 0 | ⅛ | 6 | 0 | ⅛ | 8 | 0 | ⅛ |

[1] The composition is based on the polymer content, e. g. Sample 1 is 75% oily polymer and 25% linseed oil.
[2] The flexibility was tested with both a conical (C) and rod (R) mandrel after the designated aging period. Flexibility codes: Conical 0—unaffected, 1-4 hazed and less adhesion, 5-6 fine cracking, 7-9 heavy cracking and peeling. Rod mandrel is the smallest diameter in inches over which the film can be bent without cracking. ⅛ is the best possible flexibility with the rod mandred.
[3] The linseed oil was alkali refined and prebodied to 36 poise.
[4] Enamels were made with vehicle of Sample 1. Sample 11 contained 70% by weight titanium dioxide pigment and 30% vehicle in the non-volatile. Sample 12 contained equal parts.

follows from these data that the conjugated oils are unsuitable for the purpose of this invention.

Unless the vegetable drying oil is cobodied with the copolymer oil, glossy pigmented films cannot be made. Regardless of pigmentation, the films when dry are flat and lusterless. The above data show that the flexibility of the enamels is increased by several weeks over the unmodified copolymer oil enamel. Comparative gloss data on the enamel samples used in the above table are shown below:

| Enamel | Vehicle | Pigment, percent | 45° Gloss[1] |
|---|---|---|---|
| 11 | Copolymer bodied with the linseed oil, as in Example 1. | 70 | 5.58 |
| 12 | ----do---- | 50 | 6.10 |
| 13 | Copolymer alone | 50 | 6.13 |
| 14 | Alkyd varnish | 50 | 5.90 |

[1] The gloss values were determined on a reflectometer compared to a black glass standard of 5.44.

The nature of the present invention having been thus fully set forth and specific examples of the same given, what is claimed as new and useful and desired to be secured by Letters Patent is:

1. A process for improving the flexibility of dried films of an oily copolymer prepared by the copolymerization of 60 to 90 parts of butadiene and 40 to 10 parts of styrene in the presence of 1 to 6 parts, based on monomers, of sodium at a temperature between 50° and 85° C., said copolymer having an intrinsic viscosity between 0.10 and 0.6 which comprises heating said copolymer to a temperature between 400° and 600° F. with 10 to 50 parts of a non-conjugated natural vegetable drying oil for from 15 minutes to 2.5 hours.

2. Process according to claim 1 in which the amount of combined butadiene in the copolymer is from 75% to 85% and that of styrene is from 25% to 15%.

3. Process according to claim 2 in which the amount of vegetable drying oil is between 10 and 25%.

4. Process according to claim 3 in which the amount of butadiene in the copolymer is 80% and that of styrene is 20%.

5. Process according to claim 4 in which the natural drying oil is chosen from the class consisting of linseed, soy, rapeseed, cotton seed, perilla, corn, fish, sunflower seed and safflower.

6. Process according to claim 5 in which the natural drying oil is linseed.

7. Process according to claim 5 in which the natural drying oil is soy bean.

References Cited in the file of this patent

UNITED STATES PATENTS

| | | |
|---|---|---|
| 2,563,997 | Elwell et al. | Aug. 14, 1951 |
| 2,568,950 | Crouch | Sept. 25, 1951 |
| 2,653,956 | Marhofer et al. | Sept. 29, 1953 |